United States Patent
Ebner et al.

(10) Patent No.: US 10,436,436 B2
(45) Date of Patent: Oct. 8, 2019

(54) VEHICLE LAMP ASSEMBLY

(71) Applicant: Ford Global Technologies, LLC, Dearborn, MI (US)

(72) Inventors: Kyle Ebner, Pinckney, MI (US); Aaron Anderson, Livonia, MI (US); Lizardo Amador Marin, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 15/651,245

(22) Filed: Jul. 17, 2017

(65) Prior Publication Data

US 2019/0017693 A1    Jan. 17, 2019

(51) Int. Cl.

| | |
|---|---|
| B60Q 1/04 | (2006.01) |
| B60Q 1/068 | (2006.01) |
| F21V 19/00 | (2006.01) |
| F21V 29/00 | (2015.01) |
| F21Y 115/10 | (2016.01) |
| F21V 29/83 | (2015.01) |
| B60Q 1/26 | (2006.01) |
| B60Q 3/258 | (2017.01) |
| B60Q 3/76 | (2017.01) |
| B60Q 3/80 | (2017.01) |
| B60R 1/12 | (2006.01) |
| B60Q 1/00 | (2006.01) |

(52) U.S. Cl.
CPC ............ *F21V 29/83* (2015.01); *B60Q 1/0035* (2013.01); *B60Q 1/0088* (2013.01); *B60Q 1/045* (2013.01); *B60Q 1/0441* (2013.01); *B60Q 1/0483* (2013.01); *B60Q 1/0683* (2013.01); *B60Q 1/2665* (2013.01); *B60Q 3/258* (2017.02); *B60Q 3/76* (2017.02); *B60Q 3/80* (2017.02); *B60R 1/1207* (2013.01); *F21V 19/00* (2013.01); *F21V 29/00* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 5,528,474 A * | 6/1996 | Roney | B60Q 1/2696 362/545 |
| 6,089,735 A | 7/2000 | Lee | |
| 6,276,822 B1 * | 8/2001 | Bedrosian | F21S 41/143 362/545 |

(Continued)

FOREIGN PATENT DOCUMENTS

| | | |
|---|---|---|
| DE | 102004044078 A1 | 3/2006 |
| DE | 102010007217 A1 | 8/2011 |

(Continued)

*Primary Examiner* — Britt D Hanley
(74) *Attorney, Agent, or Firm* — Vichit Chea; Price Heneveld LLP

(57) ABSTRACT

A vehicle lamp assembly is provided herein. The lamp assembly includes a housing including one or more light sources therein. The housing is configured to couple with a backing plate. A first electrical connector is disposed on the housing. A second electrical connector is attached to the backing plate and is coupled with a vehicle power source. The first electrical connector is coupled with the second electrical connector as the housing is inserted into the backing plate.

20 Claims, 8 Drawing Sheets

(56) References Cited

U.S. PATENT DOCUMENTS

| | | | | |
|---|---|---|---|---|
| 7,806,562 B2* | 10/2010 | Behr | ............... | F21K 9/00 |
| | | | | 362/294 |
| 7,972,038 B2* | 7/2011 | Albright | ............... | F21V 29/004 |
| | | | | 362/311.02 |
| 9,200,787 B2* | 12/2015 | Le Bars | ............... | F21V 19/04 |
| 9,557,026 B2* | 1/2017 | Nakano | ............... | F21S 43/195 |
| 9,919,643 B2* | 3/2018 | Tsumiyama | ............... | B60Q 1/0088 |
| 9,958,130 B2* | 5/2018 | Hino | ............... | F21V 29/767 |
| 10,207,628 B1* | 2/2019 | Salter | ............... | B60Q 1/045 |
| 10,337,717 B2* | 7/2019 | Ozawa | ............... | F21S 43/195 |
| 10,371,366 B2* | 8/2019 | Hino | ............... | F21V 23/06 |
| 2005/0180146 A1* | 8/2005 | VanderSchuit | ............... | F21S 10/06 |
| | | | | 362/367 |

FOREIGN PATENT DOCUMENTS

| | | |
|---|---|---|
| DE | 102013108877 A1 | 3/2014 |
| FR | 2785037 A1 | 10/1998 |
| FR | 2917348 A1 | 6/2007 |
| KR | 100578062 | 5/2006 |

\* cited by examiner

VEHICLE LAMP ASSEMBLY

FIELD OF THE INVENTION

The present invention generally relates to lamp assemblies, and more particularly to vehicle lamp assemblies.

BACKGROUND OF THE INVENTION

Light sources disposed within exterior vehicle lamp housings can be difficult to replace. It is therefore desired to implement lamp assemblies that make this task less difficult.

SUMMARY OF THE INVENTION

According to one aspect of the present disclosure, a vehicle lamp assembly is disclosed. The lamp assembly includes a housing having one or more light sources therein. The housing is configured to couple with a backing plate. A first electrical connector is disposed on the housing. A second electrical connector is attached to the backing plate and is coupled with a vehicle power source. The first electrical connector is coupled with the second electrical connector as the housing is inserted into the backing plate.

According to another aspect of the present disclosure, a method of attaching a vehicle lamp assembly to a vehicle is disclosed. The method includes attaching a first electrical connector to a housing, the housing including one or more light sources. Next, a second electrical connector is coupled to a backing plate. Next, the backing plate is fixedly coupled to said vehicle. Next, the housing is inserted into the backing plate through a retainer causing the first and second electrical connectors to electrically couple.

According to yet another aspect of the present disclosure, a vehicle lamp is disclosed. The vehicle lamp includes a housing including a light source therein. The housing is configured to couple to a backing plate. A first electrical connector is affixed to the housing. A second electrical connector is disposed within the backing plate. The second electrical connector is configured to couple with the first electrical connector. A retainer is configured to latch and unlatch the housing to the backing plate.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
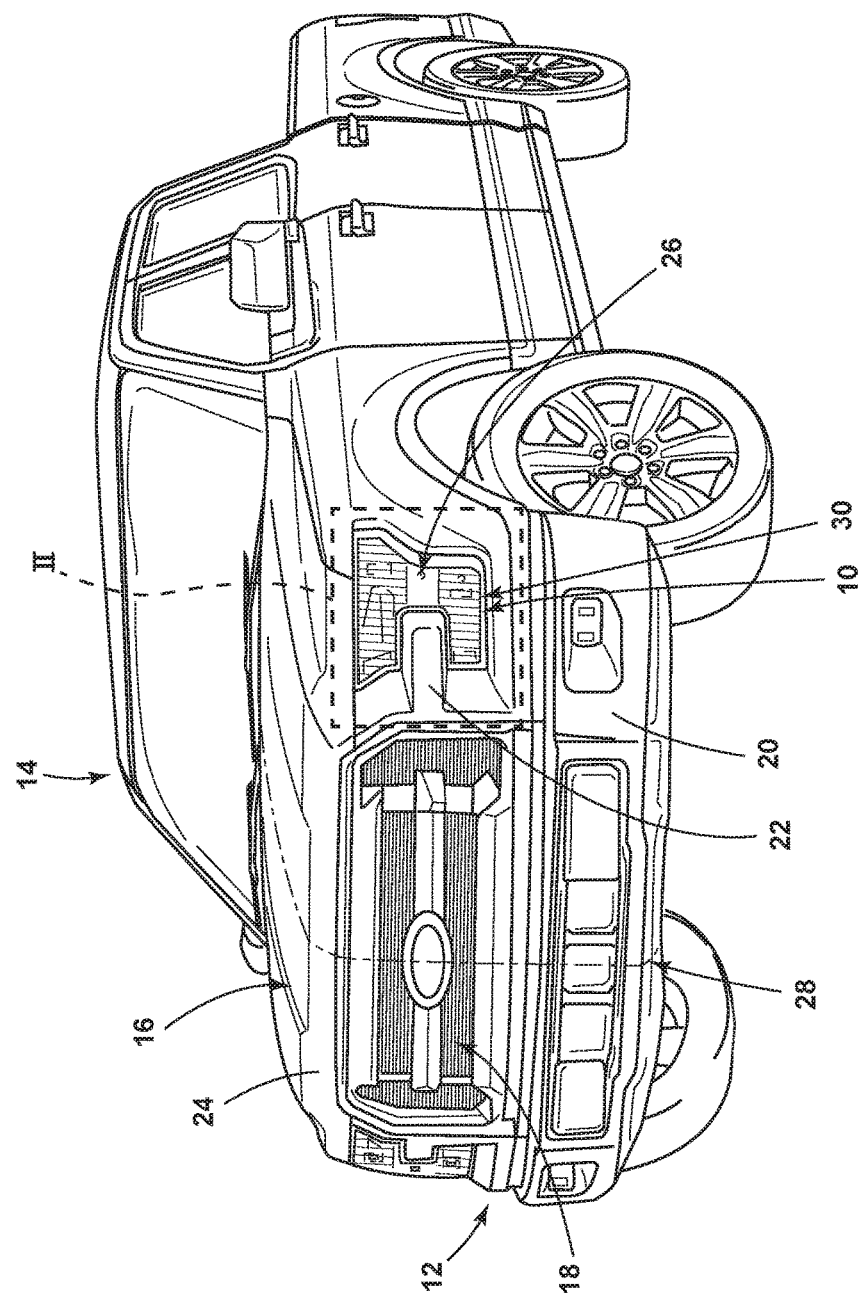
FIG. 1 illustrates a perspective view of a front portion of a vehicle employing a lamp assembly according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For examples, if a composition is described as containing components A, B, and/or C, the composition can contain A alone; B alone; C alone; A and B in combination; A and C in combination; B and C in combination; or A, B, and C in combination.

The following disclosure describes a lamp assembly for a vehicle. The lamp assembly may include a housing and a backing plate. The housing may be removed from the backing plate and a component within the housing may be removed. Once a replacement component has been installed in the housing, the housing may be reattached to the backing plate for attachment to the vehicle.

Figure 2:
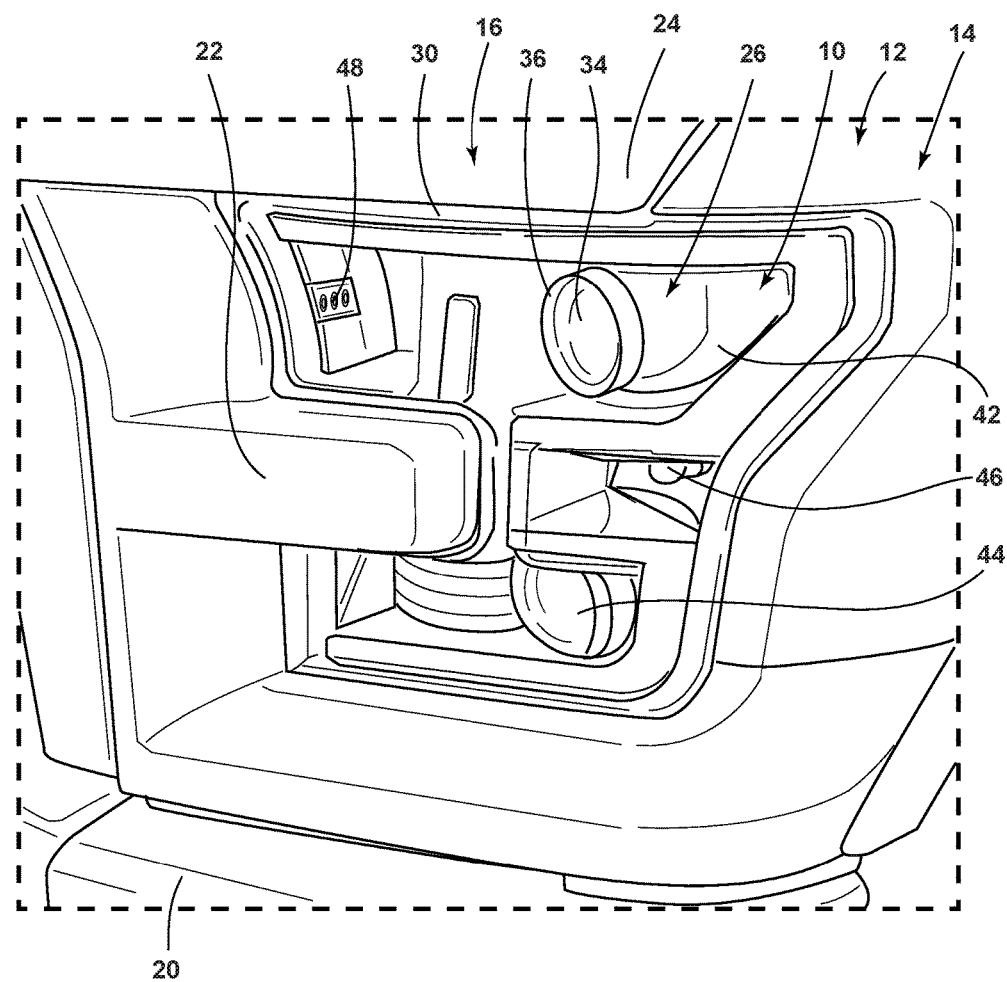
FIG. 2 is an enhanced front perspective view of the lamp assembly according to some examples.
Figure 3:
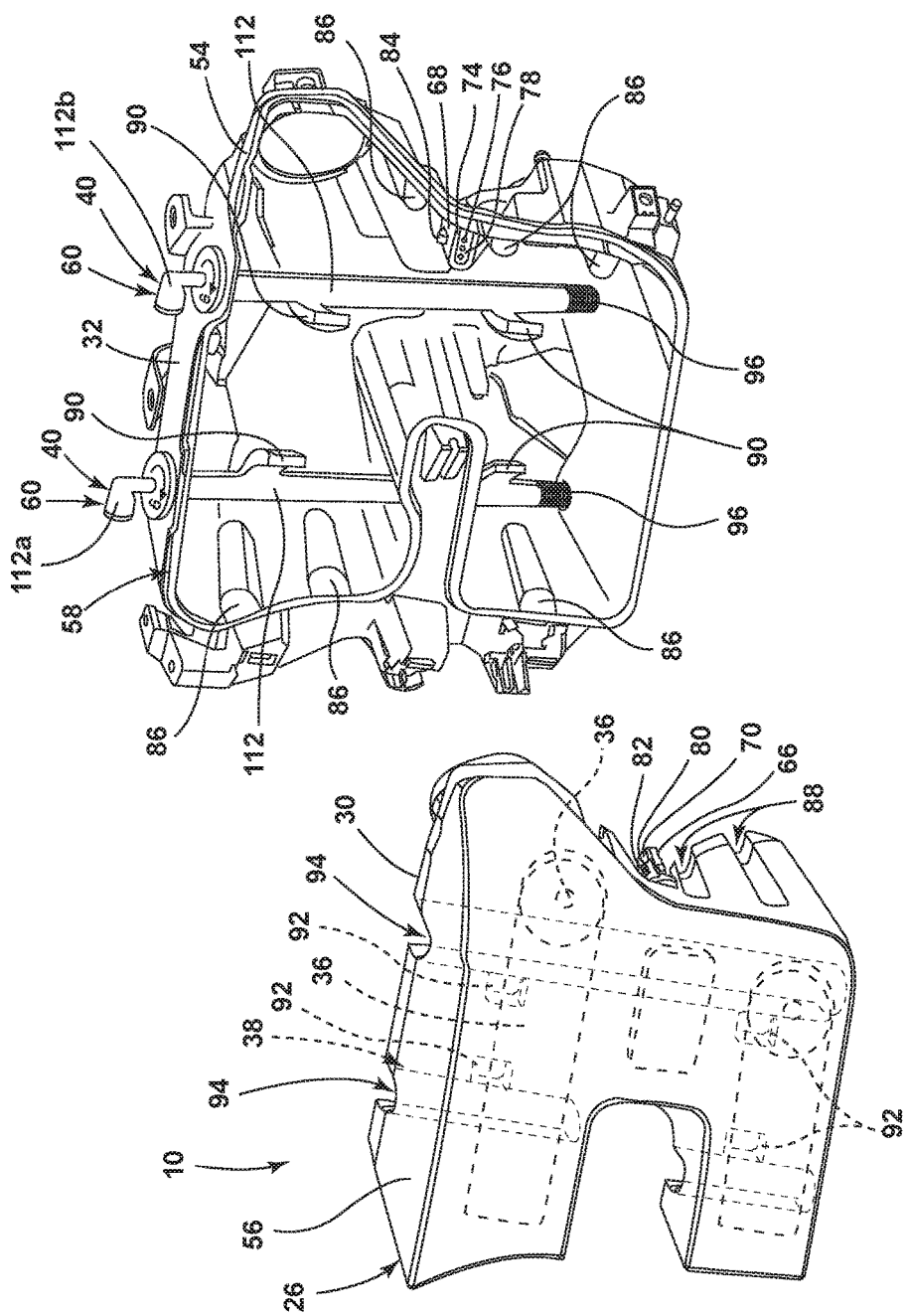
FIG. 3 is a front exploded view of the lamp assembly including a housing and a backing plate, according to some examples.

Referring to FIGS. 1-3, an automotive lamp assembly 10 is installed in a front portion 12 of a vehicle 14. The front portion 12 of the vehicle 14 may also include an engine compartment 16, a grille assembly 18, a bumper 20, a front fascia 22, and/or any additional components. A hood 24 may conceal the engine compartment 16. As illustrated, the lamp assembly 10 may be configured as a pair of headlamp assemblies 26 installed on either side of a lateral centerline 28 of the vehicle 14 to form a vehicle headlamp system. The vehicle 14 may include any number of other lamp assemblies disposed around the exterior of the vehicle 14 and/or within the vehicle 14 that may be made in accordance with the teachings provided herein. It is noted that the lamp assembly 10 described herein is adapted to couple to the front portion 12 of the vehicle 14 on either the left-hand or right-hand side of the vehicle centerline 28. The left-hand and right-hand lamp assemblies will function in a similar manner having similar componentry. The lamp assemblies may be mirror images of each other as disposed on opposing sides of the vehicle 14. However, it will also be appreciated that the lamp assemblies on opposing sides of the vehicle 14 may not be mirror images of each other so as to form a desired beam pattern. For example, the reflectors 36 disposed within the left-hand lamp assembly 10 may be positioned asymmetrically to the reflectors 36 in the right-side lamp assembly 10 to create the desired beam pattern. It will also be appreciated that the lamp assembly 10 provided herein may be disposed on any other portion within the interior of the vehicle and/or on the exterior of the vehicle without departing from the scope of the present disclosure.

The lamp assembly 10 includes a housing 30 and a backing plate 32. The housing 30 includes one or more light sources 34, one or more reflectors 36, and/or an attachment assembly 38. The backing plate 32 has a retainer 40 that is operably coupled to the attachment assembly 38 for attaching the housing 30 to the backing plate 32 and fixing the lamp assembly 10 to a desired location on the vehicle 14. The housing 30 may also protect the one or more light sources 34, the one or more reflectors 36, and/or the attachment assembly 38 from physical and chemical damage arising from environmental exposure.

The lamp assembly 10, as shown, includes an upper light source 42, a lower light source 44, an indicator light 46 disposed between the upper and lower light sources 42, 44, and a marker light 48 disposed in an inboard portion of the housing 30. The upper light source 42 and lower light source 44 may be configured as projector headlamp assemblies 26. According to some examples, the upper and lower light sources 42, 44 combine a halogen or High Intensity Discharge (HID) light source with a reflector, a lens, a cutoff shield to control the beam pattern, and a transparent cover that protects working parts and enhances appearance to form the projector headlamp assemblies 26. Alternatively, any of the light sources 34 may be configured as light emitting diodes (LEDs) to take advantage of the relatively low cost and low power consumption attributable to LEDs and/or single or multiple filament bulbs. It will be appreciated, however, that any other illumination device may be disposed within the lamp assembly 10 and/or positioned on any portion of the vehicle 14 without departing from the scope of the present disclosure. For example, the lamp assembly 10 may be disposed on the front portion 12 of the vehicle 14, within the vehicle 14, and/or on any exterior portion of the vehicle 14. In some examples, the lamp assembly 10 may be configured as a tail lamp, or any other exterior lamp, disposed on the vehicle 14. It will also be appreciated that any and/or all of the light sources 34 disposed on the front portion 12 of the vehicle 14 may be in a single housing 30, or alternatively, may be independently disposed in multiple housings 30. Each housing 30 may be operably coupled to a respective backing plate 32 for affixing the housing 30 to the vehicle 14. Alternatively, in some examples, multiple housings 30 may be configured to couple to a single backing plate 32.

Referring to FIGS. 3-6, each light source 34 may be removable from a rear side 50 of the housing 30. Moreover, the housing 30 may also include at least one wiring harness 52, which provides an electrical connection to each light source 34. In circumstances in which a light source 34 is to be changed, the housing 30 may be removed from the backing plate 32, removed from the housing 30, and/or disconnected from the wiring harness 52. A new light source 34 may be affixed to the housing 30 and coupled to the wiring harness 52 prior to reattaching the housing 30 to the backing plate 32. Accordingly, a user of the vehicle 14 need not place their hand between the backing plate 32 and the components of the engine compartment 16, as is commonly necessary when changing a light source 34 on the front portion 12 of the vehicle 14. When utilizing the lamp assembly 10 provided herein, the engine compartment packaging space may also be increased as components within the engine compartment 16 may extend closer to a rear portion of the backing plate 32, a light source 34 may be changed more easily, and the light source 34 may be changed in a safer and quicker manner.

Still referring to FIGS. 3-6, the backing plate 32 may include a surround 54 that encapsulates a rim portion 56 of the housing 30. In some examples, the surround 54 defines a parting line 58 between the housing 30 and the backing plate 32. The parting line 58 may be disposed forwardly of the grille assembly 18, the bumper 20, the fascia 22, the hood 24, and/or any other component such that the housing 30 may move between the parting line 58 and an unattached position with little to no interference with proximate vehicle components. The surround 54 may include an opaque and/or translucent material. Accordingly, when the lamp assembly 10 is assembled, the surround 54 may conceal the parting line 58.

With further reference to FIGS. 3-6, the retainer 40 of the backing plate 32 may be accessible when a vehicle hood 24 is placed in an open position. In some examples, the retainer 40 may include a locking device 60 that is configured to latch and unlatch the housing 30. Once unlatched, the housing 30 may be removed from the backing plate 32. Once removed, one or more light sources 34, or any other component, within the housing 30 may be easily changed prior to reattachment of the housing 30. In some examples, the light sources 34 may each be coupled to a removable cap 62. A protrusion 64 may be disposed on each cap 62 to rotate the cap 62 between a locked position on the housing 30 and an unlocked position, wherein the cap 62 is removable from the housing 30. In some examples, the removable caps 62 may be configured from a polymeric and/or elastomeric material. Moreover, the removable caps 62 may be in the form of removable grommets to provide access to various areas within the housing 30.

Figure 4:
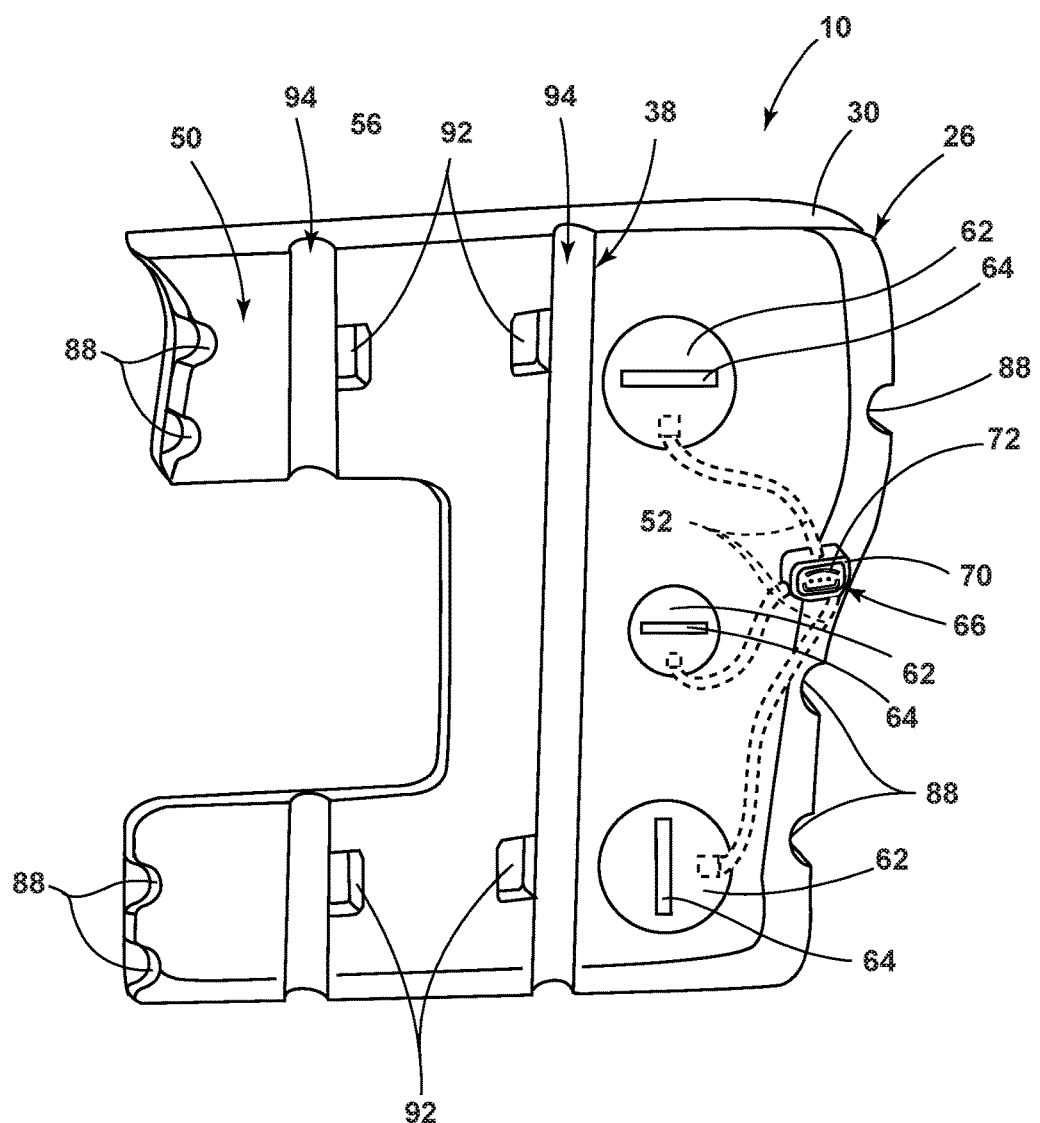
FIG. 4 is a rear perspective view of the housing, according to some examples.
Figure 5:
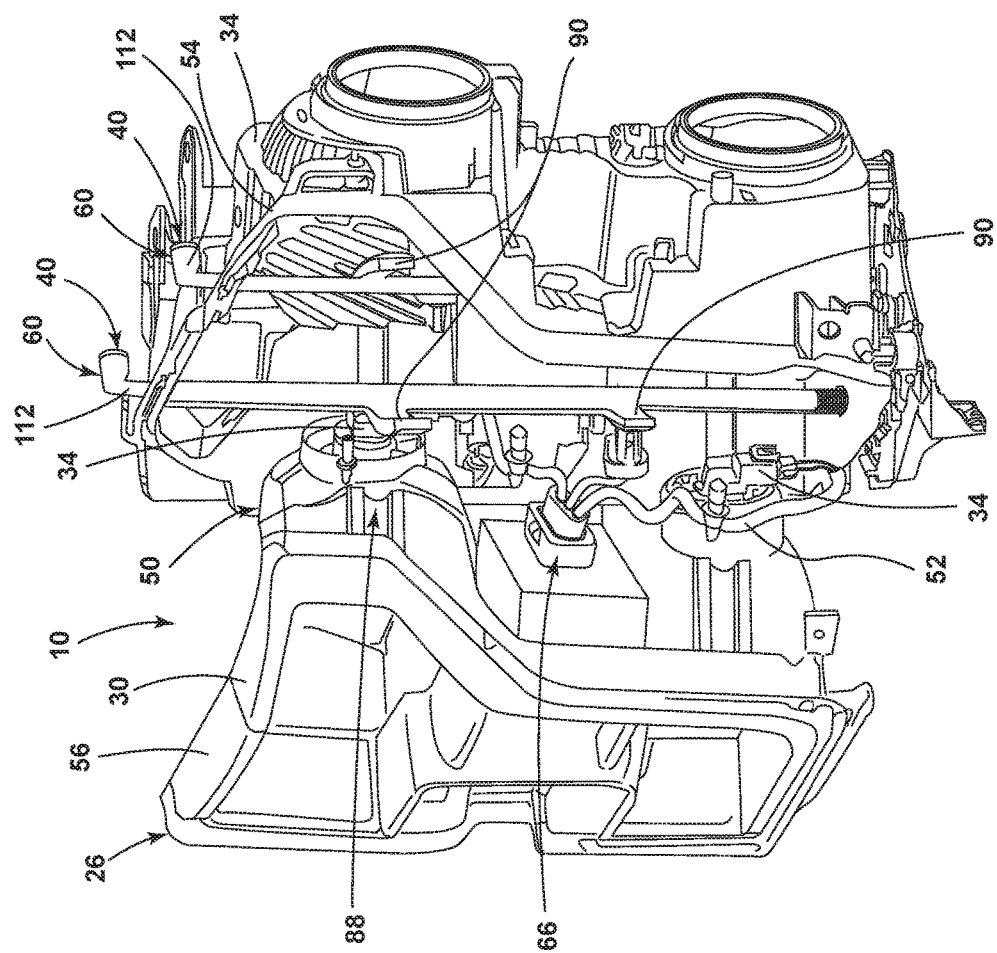
FIG. 5 is a side perspective view of the lamp assembly having the housing separated from the backing plate, according to some examples.
Figure 6:
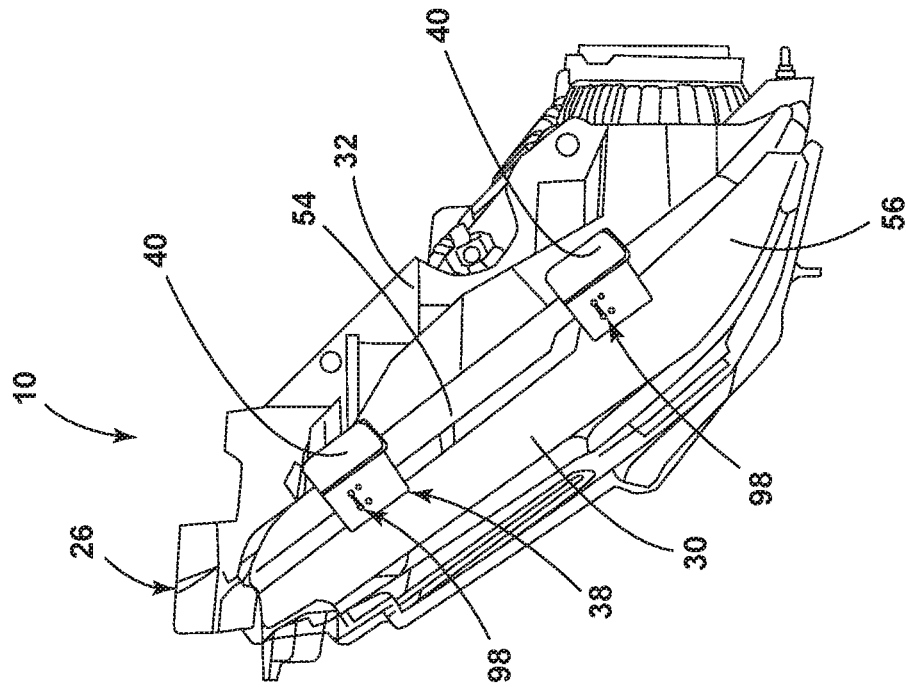
FIG. 6 is a top perspective view of the lamp assembly including a retainer configured as a pair of shafts, according to some examples.

Referring still to FIGS. 3-5, the housing 30 includes the wiring harness 52 that couples each electrically powered component therein to a vehicle controller and source of electric power within the vehicle 14. The wiring harness 52 may include a first electrical connector 66. A second, corresponding electrical connector 68 may be disposed within the backing plate 32. According to some examples, the first electrical connector 66 is released from the second electrical connector 68 as the housing 30 is removed from the backing plate 32. Moreover, the first and second electrical connectors 66, 68 may reconnect upon reinsertion of the housing 30 within the backing plate 32.

With further reference to FIGS. 3-5, the first and second electrical connectors 66, 68, in the illustrated example, are male and female connectors, respectively. The first and second electrical connectors 66, 68 may be fabricated from any suitable material, including but not limited to a nylon material, or any low dielectric material, such as a plastic material. The first electrical connector 66 may be a male connector made up of a first connector insulative substrate 70 and at least one conductive terminal 72. The at least one conductive terminal 72 of the first electrical connector 66 is mounted within the first connector insulative substrate 70. The second electrical connector 68 may be a female type connector. It will be appreciated, however, that each connector 66, 68 may be of any configuration known in the art without departing from the scope of the present disclosure. The second electrical connector 68 has a second connector insulative substrate 74 and at least one mating conductive terminal 76 on a mating surface 78, which is configured in a complementary manner relative to the first electrical connector 66 and conductive terminal 72. The mating surface 78 is a surface of the second connector insulative substrate 74 having a predetermined height and shape for coupling to the first electrical connector 66.

Referring still to FIGS. 3-5, the first electrical connector 66 includes an engagement tab 80 that may be elastically deflected and defines an engagement aperture 82. An engagement projection 84 is disposed on the second electrical connector 68 and is configured to operably couple with the engagement aperture 82. After the engagement projection 84 passes the engagement aperture 82, the engagement tab 80 resiliently returns to its initial position, thereby coupling the first electrical connector 66 to the second electrical connector 68. Moreover, the tab may be easily bent as the housing 30 is removed from the backing plate 32.

With further reference to FIGS. 3-5, the backing plate 32 may include one or more poka-yoke or error proofing features that may facilitate coupling between the housing 30 and the backing plate 32 at one or more particular, positions and/or configurations. For example, the backing plate 32 may include one or more alignment rails 86 configured to fit within the corresponding alignment grooves 88 formed within the housing 30. By aligning the one or more alignment rails 86 with the corresponding alignment grooves 88, the lamp assembly 10 may be configured such that housing 30 may be engaged with the backing plate 32 at one position (or, in some examples, a plurality of discrete positions) relative to the backing plate 32. Accordingly, the first electrical connector 64 on the housing 30 may be reconnected with the second electrical connector 68 on the backing plate 32 as the housing 30 is coupled to the backing plate 32.

Referring to FIGS. 3-5, the retainer 40 may include one or more rotatable shafts 112 having one or more flanges 90 disposed there along. The flanges 90 may have a curved profile and be configured to be inserted into attachment voids 92 defined by the housing 30. The flanges 90 may each be disposed on an internal side of each respective shaft 112. The flange 90 may be disposed in a first position to latch the housing 30 to the backing plate 32, and the flange 90 may be disposed outside of the void in a second position to define an unlatched position. To place each shaft 112 in a first, locked position in which the shaft 112, and backing plate 32, is attached to the housing 30, a user may rotate the first shaft 112a in a first direction and the second shaft 112b in a second, opposing direction. However, according to alternate examples, each shaft 112 may be rotated in any direction without departing from the teachings provided herein. The housing 30 may also define one or more channels 94 in the rear side 50 thereof that may fully and/or partially encompass the shafts 112.

To remove the housing 30 from the backing plate 32, rotating a handle portion of the shaft 112 rotates each shaft 112 to an unlocked position. When rotated, each flange 90 is removed from the corresponding attachment void of the housing 30. Then, the housing 30 is pulled away from the vehicle 14 thereby removing the housing 30 from the backing plate 32. Once removed, the components within the housing 30, including any light source 34, are accessible for maintenance. The housing 30 may also be removed for attachment of a new housing 30. Quick changes in housings 30 may allow for a wide variety of housings 30 to be attached during production or after production while minimizing costs.

To reattach the housing 30 to the backing plate 32, the housing 30 is slid through a front opening of the backing plate 32. As the housing 30 is slid within the backing plate 32, the alignment rails 86 on the backing plate 32 interact with the attachment grooves 88 on the housing 30 to guide the housing 30 into proper location within the housing 30. The channel 94 and the shafts 112 also interact with one another for locating the housing 30 within the backing plate 32. As the housing 30 is slid into the attached position, the first electrical connector 66 on the housing 30 is inserted into the second electrical connector 68 on the backing plate 32 thereby providing electrical power to the components within the housing 30. Each rotatable shaft 112 is then rotated to a locked position, which inserts the flanges 90 on each respective rotatable shaft 112 into corresponding attachment voids 92 defined by the housing 30.

With reference to FIG. 3, each rotatable shaft 112 may include a threaded portion 96 on a bottom portion thereof. The threaded portion 96 may affix the bottom portion of each shaft 112 to a bottom portion of the backing plate 32. Moreover, a user may aim the lamp assembly 10 in a desired direction by adjusting the threaded portion 96 a desired distance upwardly and/or downwardly. For example, to aim the lamp assembly 10 in a more downward direction, a user may further screw each threaded portion 96 further through the backing plate 32 by rotating the shaft 112. In some examples, the lamp assembly 10 may be adjusted with one or more adjusters that may be mounted to the removable lamp assembly 10. The adjusters may adjust the light beam alignment by moving one or more reflectors 36 within the lamp assembly 10. The adjusters may be accessed and adjusted with a torques and/or inverted torques bit tool.

In other examples, the retainer 40 may include the shaft 112 and may be insertable through an opening defined by the backing plate 32 and through the channel 94 within the housing 30. The shaft 112 may be removed from the backing plate 32 and the channel 94 to release the housing 30. In such examples, the channel 94 may fully encompass the shafts 112 to maintain the shaft 112 within the backing plate 32. A portion or all of the channel 94 to maintain the housing 30 and backing plate 32 in an attached relationship may encompass the shaft 112.

Figure 7:
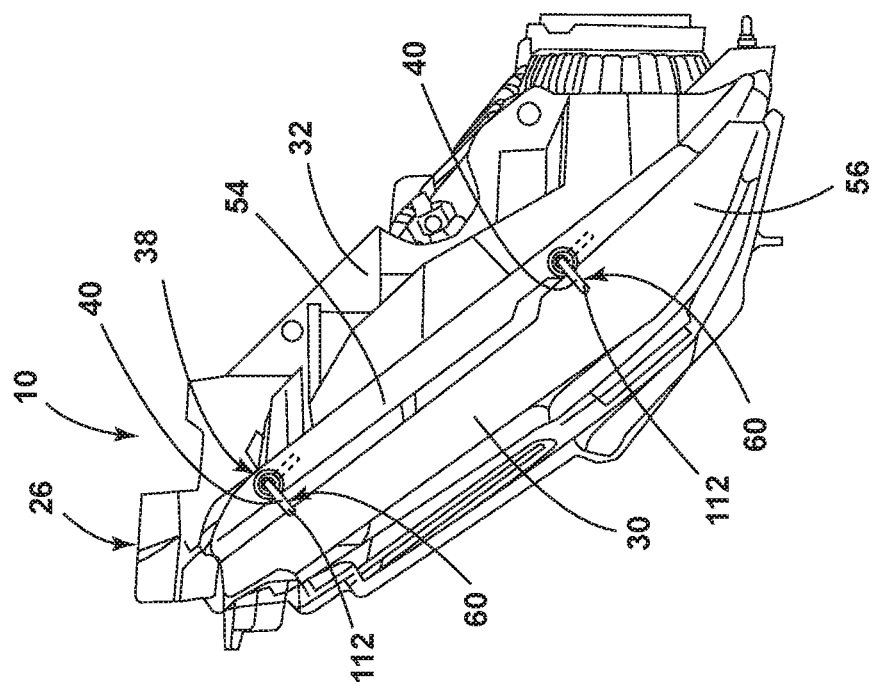
FIG. 7 is a top perspective view of the lamp assembly including a retainer configured as a pair of tabs, according to some examples.

Referring to FIG. 7, in some examples, the retainer 40 may additionally, and/or alternatively, include a plurality of tabs 98 corresponding with an attachment region along a top portion of the housing 30. Thus, each of the tabs 98 may be configured to be received in the housing 30 in order to releasably secure the housing 30 to the backing plate 32 and to prevent housing 30 from being inadvertently withdrawn from the backing plate 32. In some examples, each of the tabs 98 may be shaped identically. Alternatively, one or more of the tabs 98 may have a different shape and/or size, and the corresponding attachment region of the housing 30 may have a corresponding different shape and/or size relative to the other openings in order to serve as an orientation/poka-yoke, or other such feature to allow for error proofing during assembly. Such an error-proofing feature may be used to force coupling between the housing 30 and the backing plate 32 at one or more particular orientations and/or prevent undesired errors in such orientations during assembly.

Figure 9:
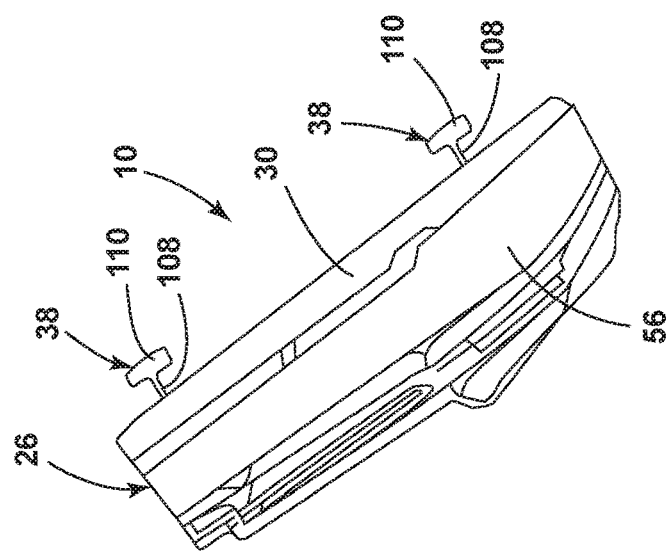
FIG. 9 is a top perspective view of the lamp assembly having a pair of attachment assemblies thereon.
Figure 8:
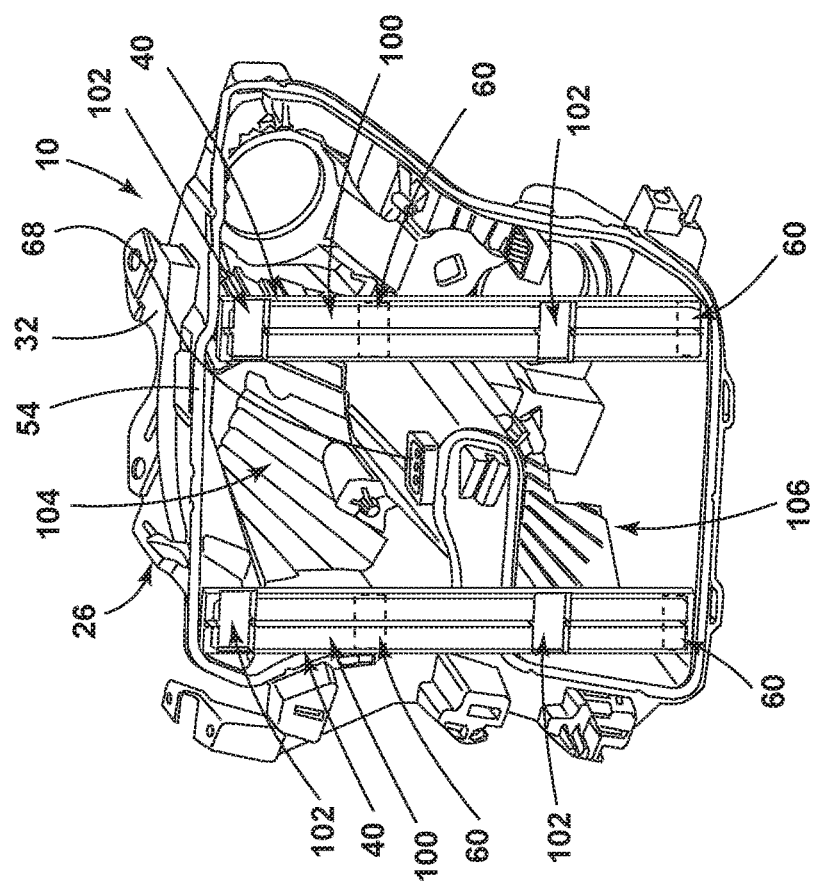
FIG. 8 is a front perspective view of the lamp assembly having a retainer configured as a pair of vertical track assemblies, according to some examples.
Figure 10:
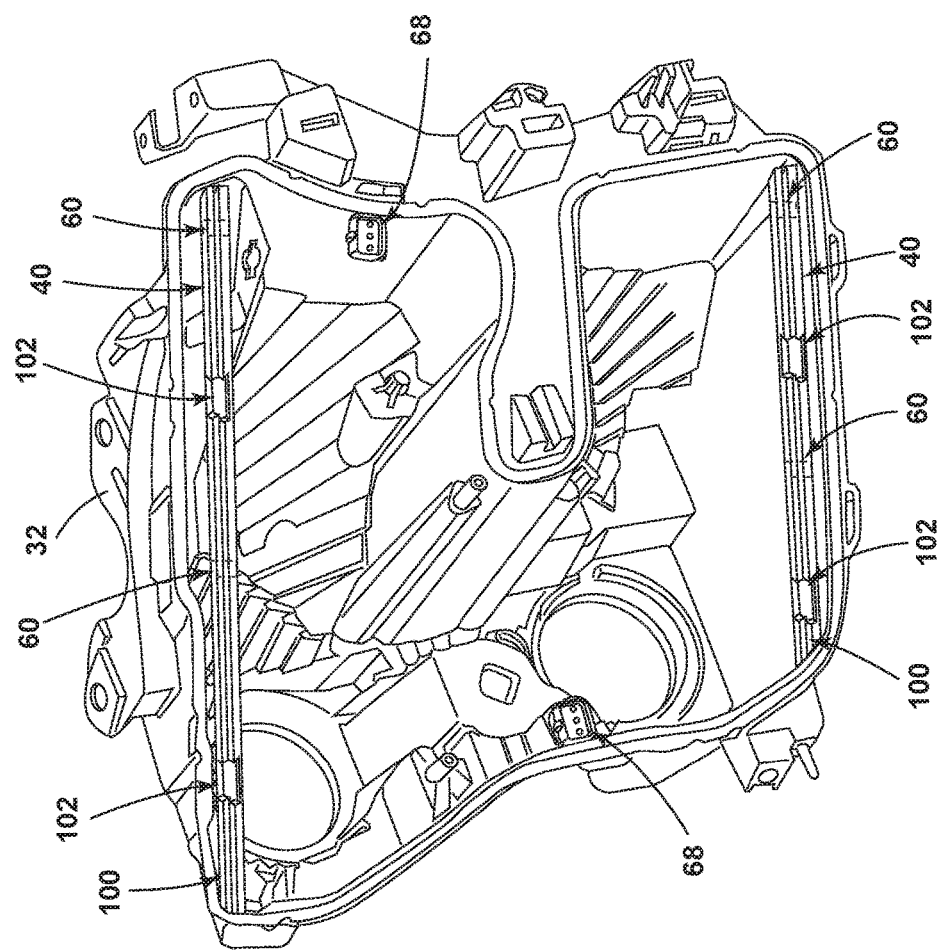
FIG. 10 is a front perspective view of the lamp assembly having a retainer configured as a pair of vertical track assemblies, according to some examples.

Referring to FIGS. 8-10, the retainer 40 may include one or more track assemblies 100 that are disposed on the backing plate 32 in a vertical (FIG. 8) and/or horizontal (FIG. 10) orientation. The track assembly 100 is adapted to cooperatively receive the attachment assembly 38 disposed on the housing 30. The track assembly 100 is operatively mounted to the backing plate 32. The track assembly 100 may include one or more insertion regions 102 in which the attachment assembly 38 may be disposed within the track assembly 100. For example, the backing plate 32 may define the upper and lower cavities 104, 106. A first insertion region 102 may be disposed proximate a top portion of the upper cavity 104 and a second insertion region 102 may be disposed proximate an upper portion of the lower cavity 106. The insertion regions 102 may be vertically aligned along multiple track assemblies 100 that are attached to the backing plate 32. Alternatively, the insertion regions 102 on the first track assembly 100 may be offset from insertion regions 102 on the second track assembly 100 in order to serve as an orientation/poka-yoke, or other such feature to allow for error proofing during assembly. A latching mechanism, generally indicated at 60, is operatively mounted to the track assembly 100 and may maintain the attachment assembly 38 in a substantially fixed position. In this way, the housing 30 is secured to the backing plate 32 when the attachment member is coupled to the latching mechanism. In some examples, the attachment assembly 38 may include a first element 108 extending outwardly from the housing 40 and a transverse second element 110 that is configured to be disposed within the track assembly 100.

Use of the present disclosure may offer a variety of advantages. For example, use of the lamp assembly provided herein may provide easier access to the electrical components within the lamp assembly. Additionally, the housing of the lamp assembly may be released in a quick manner than compared to current lamp assemblies. Moreover, the housing may be quickly changed during vehicle assembly, or after vehicle assembly, providing for a wide array of potential housings that may be attached to the vehicle by a manufacturer, dealer, and/or end user of the vehicle leading to additional customization of the vehicle. The lamp assembly may include any or all of the features provided herein and is manufactured at low costs when compared to standard vehicle lamp assemblies and lighting assemblies.

A lamp assembly is provided herein. The lamp assembly includes a housing including one or more light sources therein. The housing is configured to couple with a backing plate. A first electrical connector is disposed on the housing. A second electrical connector is attached to the backing plate and is coupled with a vehicle power source. The first electrical connector is coupled with the second electrical connector as the housing is inserted into the backing plate. The lamp assembly may be configured as a vehicle lamp assembly. Examples of the lamp assembly can include any one or a combination of the following features:

the first electrical connector is coupled with a wiring harness, the wiring harness providing electrical power to the one or more light sources within the housing;
a retainer configured to latch and unlatch the housing to the backing plate;
the retainer includes a shaft disposed through the backing plate and within a channel defined by the housing;
the shaft includes a flange thereon, the flange rotatable between a first position and a second position;
the flange interacts with a void defined by the housing in the first position to latch the housing to the backing plate and the flange is free of the void in the second position to define an unlatched position of the housing;
the retainer includes one or more tabs on the backing plate that interact with an attachment region of the housing to releasably couple the housing to the backing plate;
the retainer is accessible from a location within an engine compartment;
the retainer includes a track assembly on the backing plate and an attachment assembly on the housing that is releasably disposed within the track assembly;
a portion of the shaft includes a threaded region and the threaded region interacts with the backing plate; and/or
alignment rails on the backing plate; and alignment grooves on the housing to guide insertion of the housing into the backing plate.

Moreover, a method of attaching a vehicle lamp assembly to a vehicle is provided herein. The method includes attaching a first electrical connector to a housing, the housing including one or more light sources. Next, a second electrical connector is coupled to a backing plate. Next, the backing plate is fixedly coupled to said vehicle. Next, the housing is inserted into the backing plate through a retainer causing the first and second electrical connectors to electrically couple. Examples of the method of attaching a vehicle lamp assembly can include any one or a combination of the following features:

rotating a shaft within the backing plate to place flanges on the shaft within engagement voids defined by the housing; and/or
inserting an attachment assembly on the housing into a track assembly on the backing plate.

According to other examples, a vehicle lamp is provided herein. The vehicle lamp includes a housing including a light source therein. The housing is configured to couple to a backing plate. A first electrical connector is affixed to the housing. A second electrical connector is disposed within the backing plate. The second electrical connector is configured to couple with the first electrical connector. A retainer is configured to latch and unlatch the housing to the backing plate. Examples of the lamp assembly can include any one or a combination of the following features:

the housing is removed in a vehicle forward direction when the retainer is disposed in an unlatched position;
the retainer includes a pair of vertically extending shafts within the backing plate;
the retainer includes a track assembly coupled to the backing plate and an attachment assembly disposed on the housing;
the retainer is accessible when a vehicle hood is disposed in an open position; and/or
alignment rails on the backing plate; and alignment grooves on the housing to guide insertion of the housing into the backing plate.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For examples, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle lamp assembly comprising:
    a housing including one or more light sources therein, the housing configured to couple with a backing plate;
    a first electrical connector disposed on the housing; and
    a second electrical connector attached to the backing plate and coupled with a vehicle power source, wherein the first electrical connector is coupled with the second electrical connector as the housing is inserted into the backing plate.

2. The vehicle lamp assembly of claim 1, wherein the first electrical connector is coupled with a wiring harness, the wiring harness providing electrical power to the one or more light sources within the housing.

3. The vehicle lamp assembly of claim 1, further comprising:
    a retainer configured to latch and unlatch the housing to the backing plate.

4. The vehicle lamp assembly of claim 3, wherein the retainer includes a shaft disposed through the backing plate and within a channel defined by the housing.

5. The vehicle lamp assembly of claim 4, wherein the shaft includes a flange thereon, the flange rotatable between a first position and a second position.

6. The vehicle lamp assembly of claim 5, wherein the flange interacts with a void defined by the housing in the first position to latch the housing to the backing plate and the flange is free of the void in the second position to define an unlatched position of the housing.

7. The vehicle lamp assembly of claim 3, wherein the retainer includes one or more tabs on the backing plate that interact with an attachment region of the housing to releasably couple the housing to the backing plate.

8. The vehicle lamp assembly of claim 3, wherein the retainer is accessible from a location within an engine compartment.

9. The vehicle lamp assembly of claim 1, further comprising:
    alignment rails on the backing plate; and
    alignment grooves on the housing to guide insertion of the housing into the backing plate.

10. The vehicle lamp assembly of claim 3, wherein the retainer includes a track assembly on the backing plate and an attachment assembly on the housing that is releasably disposed within the track assembly.

11. The vehicle lamp assembly of claim 5, wherein a portion of the shaft includes a threaded region and the threaded region interacts with the backing plate.

12. A method of attaching a vehicle lamp assembly to a vehicle, the method comprising:
    attaching a first electrical connector to a housing, the housing including one or more light sources;

coupling a second electrical connector to a backing plate;
fixedly coupling the backing plate to said vehicle; and
inserting the housing into the backing plate through a retainer causing the first and second electrical connectors to electrically couple.

13. The method of claim 12, further comprising:
rotating a shaft within the backing plate to place flanges on the shaft within engagement voids defined by the housing.

14. The method of claim 8, wherein the inserting the housing into the backing plate through a retainer causing the first and second electrical connectors to electrically couple step further comprises:
inserting an attachment assembly on the housing into a track assembly on the backing plate.

15. A vehicle lamp assembly comprising:
a housing including a light source therein, the housing configured to couple to a backing plate;
a first electrical connector affixed to the housing;
a second electrical connector disposed within the backing plate, the second electrical connector configured to couple with the first electrical connector; and
a retainer configured to latch and unlatch the housing to the backing plate.

16. The vehicle lamp assembly of claim 15, wherein the housing is removed in a vehicle forward direction when the retainer is disposed in an unlatched position.

17. The vehicle lamp assembly of claim 15, wherein the retainer includes a pair of vertically extending shafts within the backing plate.

18. The vehicle lamp assembly of claim 15, wherein the retainer includes a track assembly coupled to the backing plate and an attachment assembly disposed on the housing.

19. The vehicle lamp assembly of claim 15, wherein the retainer is accessible when a vehicle hood is disposed in an open position.

20. The vehicle lamp assembly of claim 15, further comprising:
alignment rails on the backing plate; and
alignment grooves on the housing to guide insertion of the housing into the backing plate.

* * * * *